(12) United States Patent
Suzuki

(10) Patent No.: US 7,783,157 B2
(45) Date of Patent: Aug. 24, 2010

(54) RECORDING/REPRODUCING APPARATUS

(75) Inventor: Koichiro Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1191 days.

(21) Appl. No.: 11/385,286

(22) Filed: Mar. 21, 2006

(65) Prior Publication Data
US 2006/0245722 A1 Nov. 2, 2006

(30) Foreign Application Priority Data
Apr. 15, 2005 (JP) ............................. 2005-118171

(51) Int. Cl.
*H04N 5/91* (2006.01)
(52) U.S. Cl. .......................................... 386/83; 386/46
(58) Field of Classification Search .................. 386/46, 386/83
See application file for complete search history.

(56) References Cited

U.S. PATENT DOCUMENTS

2004/0078829 A1* 4/2004 Patel et al. .................. 725/135
2004/0197078 A1* 10/2004 Yoon et al. ................... 386/46

FOREIGN PATENT DOCUMENTS

JP 2004-349745 A 12/2004

* cited by examiner

*Primary Examiner*—Thai Tran
*Assistant Examiner*—Girumsew Wendmagegn
(74) *Attorney, Agent, or Firm*—Canon U.S.A., Inc. I.P. Division

(57) ABSTRACT

A recording/reproducing apparatus having a receiving unit configured to receive a television broadcast, a recording/reproducing unit configured to record image data of the received broadcast program on a recording medium, and reproduce the image data from the recording medium, an output unit configured to output the image data of the received broadcast program, or the image data reproduced from the recording medium to a display device, a designation unit configured to designate a broadcast channel, a storage unit configured to store channel information indicating image data of a program to be reproduced if the designation unit designates a predetermined channel among the programs recorded on the recording medium, and a control unit configured to cause the recording/reproducing unit and the output unit to reproduce the image data from the recording medium and output the data to the display device, in accordance with the channel information stored on the storage unit.

2 Claims, 4 Drawing Sheets

RECORDING/REPRODUCING APPARATUS

BACKGROUND OF THE INVENTION

1. Field of the Invention

The present invention relates to a recording/reproducing apparatus, and, more particularly, to a recording/reproducing apparatus configured to receive, record, and reproduce television broadcasts.

2. Description of the Related Art

Conventionally, video tape recorders (VTRs) are known which receive television broadcasts, record the television broadcasts on a magnetic tape and reproduce the recorded television broadcasts. In such VTRs, if a user wants to reproduce a program recorded on a tape while watching a television broadcast, the reproduction of the tape is started in response to the operation of a reproduction button, and the signal of the program reproduced from the tape is output alternating with the television broadcast program. Further, if the user wants to watch the television broadcast while reproducing the tape, the user cannot switch to the television broadcast even if channel buttons are operated. In such a case, it is common to operate a stop button.

In recent years, instead of the magnetic tapes, disk recorders which record television broadcast programs on a hard disk (HDD) or optical disks such as a digital versatile disc (DVD) have come into use (e.g., refer to Japanese patent application laid-open No. 2004-349745). Even in the disk recorders, if the user wants to watch the television broadcast while reproducing the program recorded on the hard disk, the reproduction has to be stopped.

As described above, in the conventional VTRs and disk recorders, if the user wants to watch the television broadcast while reproducing the program recorded on the hard disk or the tape, the user has to operate the stop button. On the other hand, when the reproduction of the recorded program is being stopped, the user does not need to operate the stop button and can designate a channel without conducting any other operation.

Accordingly, when the user watches television broadcasts, conventionally, the user is forced to perform various operations depending on the situations, and therefore, it is not convenient for the user to use the devices.

Further, if the user wants to watch the TV broadcast while reproducing the program recorded on the hard disk or the tape, the user is forced to perform two steps; namely, stopping the reproduction and switching to a desired channel.

SUMMARY OF THE INVENTION

The present invention overcomes the above-described drawbacks.

According to an aspect of the present invention, an apparatus configured to switch between a television program and a recorded program is provided. The apparatus reproduces the recorded program with simple operations on the part of the user.

According to an aspect of the present invention, a recording/reproducing apparatus is provided. The recording/reproducing apparatus includes: a receiving unit configured to receive a television broadcast; a recording/reproducing unit configured to record image data of the broadcast program received by the receiving unit on a recording medium, and reproduce the image data from the recording medium; an output unit configured to output the image data of the broadcast program received by the receiving unit or the image data reproduced from the recording medium to a display device; a designating unit configured to designate a broadcast channel; a storage unit configured to associate channel information including a first information about a broadcast channel number to be received and a second information indicating instruction to reproduce the image data recorded on the recording medium, with the value of a broadcast channel that the designating unit can designate, and store the associated information; and a control unit configured to cause the receiving unit to receive a television broadcast program corresponding to the broadcast channel number, if the channel information associated with the value of the instructed channel is the first information, and to cause the recording/reproducing unit and the output unit to reproduce the image data from the recording medium and output the data to the display device if the channel information associated with the value of the channel designated by the designating unit is the second information.

According to another aspect of the present invention, a recording/reproducing apparatus includes: a receiving unit configured to receive a television broadcast; a recording/reproducing unit configured to record image data of the broadcast program received by the receiving unit on a recording medium, and reproduce the image data from the recording medium; an output unit configured to output the image data of the broadcast program received by the receiving unit and the image data reproduced from the recording medium to a display device; a designating unit configured to designate a broadcast channel; a storage unit configured to store channel information which indicates image data of a program to be reproduced among image data of programs recorded on the recording medium if a predetermined channel is designated by the designating unit; and a control unit configured to cause the recording/reproducing unit and the output unit, in response to the designation of the predetermined channel by the designating unit, to reproduce the image data indicated by the channel information stored in the storage unit from the recording medium and output the reproduced image data to the display device.

According to another aspect of the present invention, a method of controlling a recording/reproducing apparatus configured to receive a television broadcast, record image data of the received broadcast program on a recording medium, reproduce the image data from the recording medium, and output the image data of received broadcast program or the image data reproduced from the recording medium is provided. The method includes: receiving a broadcast channel designated by a designation unit; associating channel information including a first information about a broadcast channel number to be received and a second information indicating instruction to reproduce the image data recorded on the recording medium, with the value of a broadcast channel that the designation unit can designate; storing the associated channel information in a memory; controlling a receiving unit, so as to receive a television broadcast program corresponding to the broadcast channel number if the channel information associated with the value of the designated broadcast channel is the first information, and reproducing the image data from the recording medium to output the data to a display device if the channel information associated with the value of the designated broadcast channel is the second information.

According to yet another aspect of the present invention, a method of controlling a recording/reproducing apparatus configured to receive a television broadcast, record image data of the received broadcast program on a recording medium, reproduce the image data from the recording medium, and output the image data of the received broadcast program or the image data reproduced from the recording medium is provided. The method includes: receiving a broadcast channel designated by a designation unit; storing channel information indicating image data of a program to be reproduced in a memory if a predetermined channel is designated by the designation unit, among image data of programs recorded on the recording medium; and reproducing the image data from the recording medium and outputting the reproduced image data to the display device, in response to the designation of the predetermined channel designated by the designation unit indicated by the channel information stored in the memory.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate numerous exemplary embodiments, features and aspects of the invention and, together with the description, serve to explain the principles of the invention.

DETAILED DESCRIPTION OF THE EXEMPLARY EMBODIMENTS

Various exemplary embodiments, features and aspects of the present invention will now be herein described in detail below with reference to the drawings.

Figure 1:
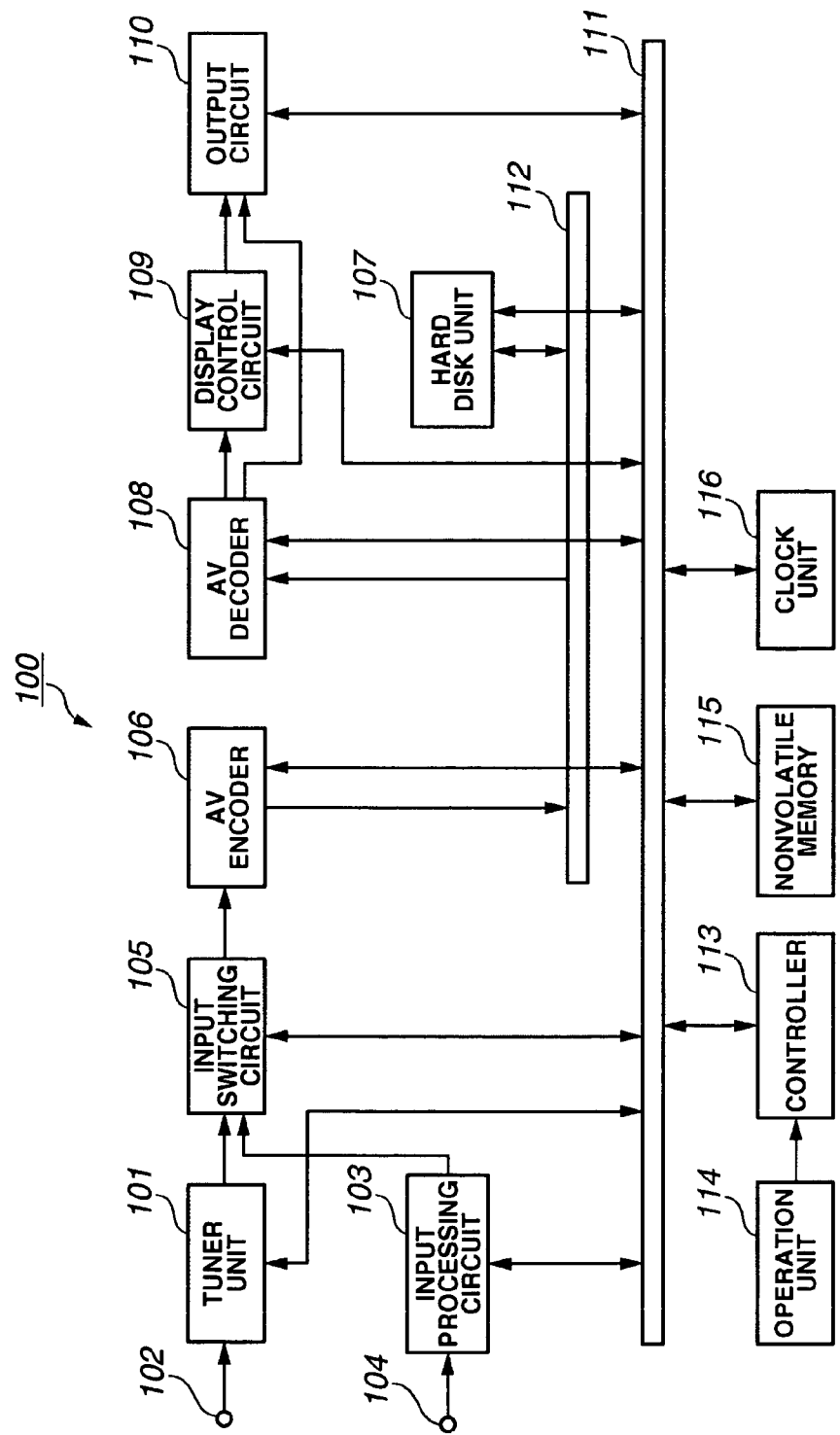
FIG. 1 illustrates an exemplary structure of a receiving apparatus to which the present invention is applied.

FIG. 1 illustrates an exemplary structure of a receiving apparatus 100 to which the present invention is applied.

In FIG. 1 are shown a tuner unit 101, an antenna terminal 102, an input processing circuit 103, an input terminal 104, an input switching circuit 105, an audio/video (AV) encoder 106, a hard disk (HDD) unit 107, an AV decoder 108, a display control circuit 109, an output circuit 110, a control bus 111, a data bus 112, a controller 113, an operation unit 114, a nonvolatile memory 115, and a clock unit 116.

The tuner unit 101 separates a designated channel from high-frequency signals of television broadcasts input from the antenna terminal 102 in accordance with an instruction from the controller 113. Then, the tuner unit 101 decodes the separated broadcast signal, and outputs the video signal and audio signal of the received broadcast program. Further, the tuner unit 101 extracts information of an EPG (Electronic Program Guide) which is multiplexed over broadcast waves, and outputs the information to the nonvolatile memory 115. The EPG describes schedules of programs broadcasted in the future and information on the programs such as genres. With the EPG information, recording of the reserved broadcast programs can be implemented using known methods.

The input processing circuit 103, in accordance with the instruction from the controller 113, processes a video signal and an audio signal provided from an external device to the input terminal 104, and outputs the processed signals.

The input switching circuit 105, in accordance with the instruction from the controller 113, selects either of the video and the audio signal output from the tuner unit 101, or the video and the audio signal output from the input processing circuit 103, and outputs the selected video signal and audio signal.

The AV encoder 106, in accordance with the instruction from the controller 113, encodes the video and the audio signal output from input switching circuit 105 in accordance with MPEG (Moving Picture Experts Group) standards, generates an MPEG stream, and outputs the MPEG stream to the data bus 112.

The HDD unit 107, in accordance with the instruction from the controller 113, records the MPEG stream being output to the data bus 112. Further, in accordance with the instruction to reproduce from the controller 113, the HDD unit 107 outputs recorded broadcast programs or the MPEG streams of video and audio from the external device to the data bus 112. Information about the recorded data is recorded as management information on a predetermined region of the HDD unit 107.

The AV decoder 108, in accordance with the instruction from the controller 113, decodes the MPEG stream being output from the AV encoder 106 or the MPEG stream reproduced from the HDD unit 107, and outputs the video signal and audio signal.

The display control circuit 109, in accordance with the instruction from the controller 113, superimposes characters or graphics on the video signal output from the decoder 108, and generates data for display screen.

The output circuit 110, in accordance with the instruction from the controller 113, converts the video signal for display input from the display control circuit 109 and the audio signal input from the AV decoder 108 to signals of a format suitable for an external television monitor, and outputs the signals.

The control bus 111 is a path through which the controller 113 controls blocks in the receiving apparatus 100. The data bus 112 is a path to exchange MPEG streams among the blocks in the apparatus.

The controller 113 detects that each button of the operation unit 114 is operated and controls the blocks in the receiving apparatus 100.

The operation unit 114 includes buttons to designate a channel such as a channel number button, a channel-up button, and a channel-down button. Further, as buttons to control recording, the unit includes a recording button and a recording stop button. Moreover, the unit includes a reproduction button to reproduce data recorded on the HDD unit 107, a fast-forward button, a fast-rewind button, a pause button, a cross key to select a program to be reproduced or various menu items, a decision key, or the like. The operation unit 114 can be composed of a known remote-controller and a receiving circuit.

The nonvolatile memory 115 is a semiconductor memory used to store a channel table. The clock unit 116 is used to acquire current time.

Figure 2:
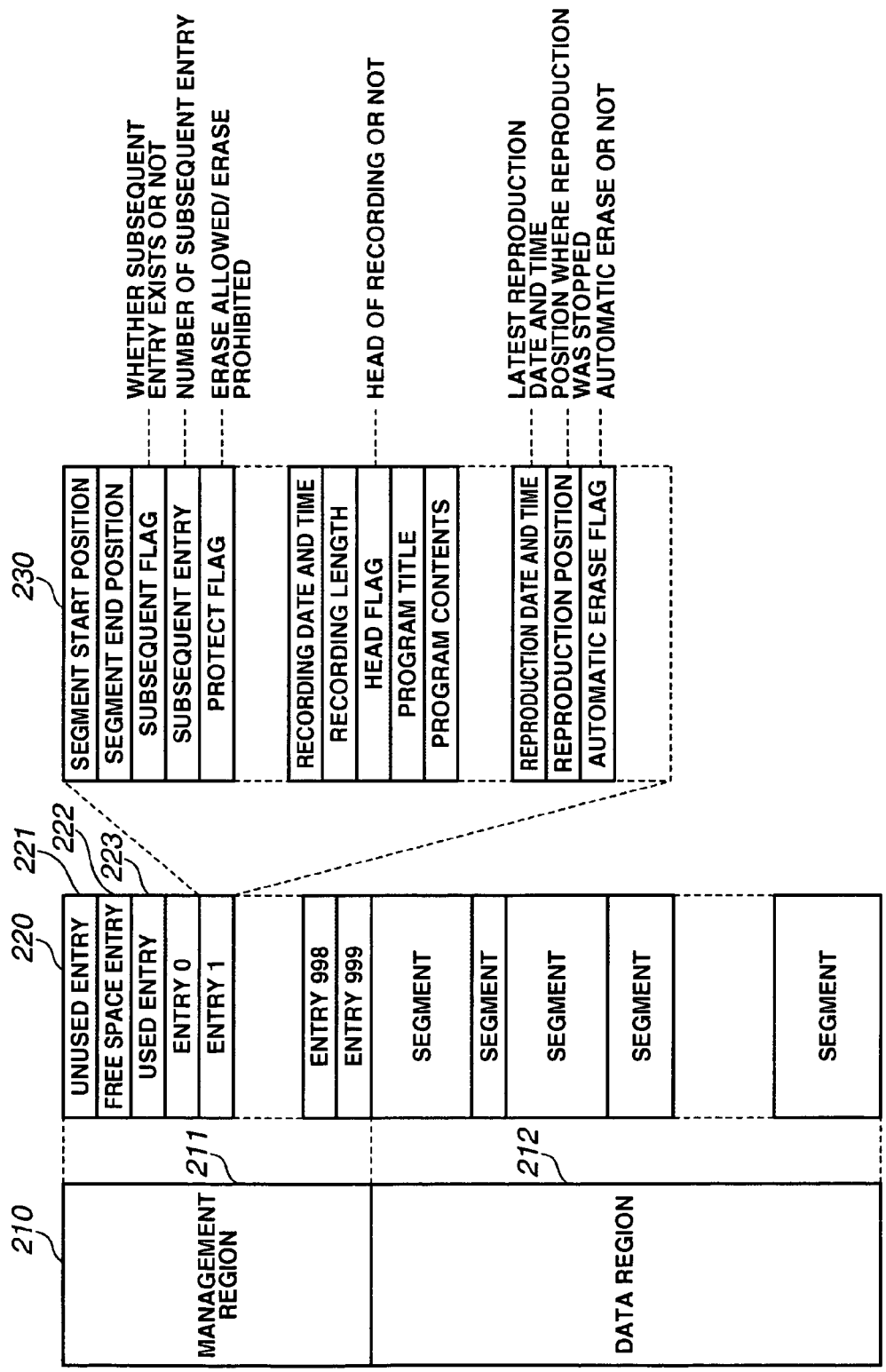
FIG. 2 illustrates an exemplary format to record data on a hard disk unit.

An information recording format of the HDD unit 107 will be described with referring to FIG. 2. The figure illustrates an exemplary recording format to record data on the HDD unit 107. In FIG. 2 are shown a disk image 210, an entry structure 220, and an entry 230.

Roughly speaking, the disk image 210 of the HDD unit 107 is divided into two regions; a management region 211 and a data region 212. In the management region 211, information is stored in a unit referred to as an entry, and in the data region 212, information is stored in a unit composed of segments. One or a plurality of entries and segments is allocated to a single content, and the series of segments are recorded and reproduced. Each entry stores information about the subsequent entry, and constitutes a list structure linked by the information. The entry stored in the management region 211 is linked to one of an unused list, a free space list, or a used list.

A first entry of the management region 211 is an unused entry 221 at the head of the unused list. The unused list is composed of entries which have no stored information about segments allocated to the data region. If a new entry is required to record data, an entry is taken out from the list. If an entry becomes unnecessary due to a link of segments, the entry is returned to the list.

A second entry is a free space entry 222 at the head of the free space list. The free space list is composed of segments on which no data is recorded, among segments allocated to the data region. In a case of newly entering data, an entry is taken out from the list, and actual data is recorded on the corresponding segment. If the segment is filled with the records, the entry is returned to the used list, and an entry is taken out from the free space list. In a case where the recording is stopped in the middle of the segment, the segment is divided at the position where the recording is stopped. That is, the current entry which corresponds to the recorded part of the segment is returned to the used list. The segment which corresponds to the unused part is taken out from the unused list, and returned to the free space list.

A third entry is a used entry 223 at the head of the used list. The used list is composed of segments on which data is recorded, among segments allocated to the data region. In a case of newly entering data, an entry is taken out from the free space list, necessary information is stored on the entry, and the entry is linked to the used list. In a case of erasing the record, the entry corresponding to the recorded segment is returned to the free space list.

In the free space list or the used list, adjacent segments can be connected together. In this case, the two segments are linked and one of two entries is returned to the unused list. By such operation, the fragmentation of segments due to repeated recordings and reproductions can be somewhat prevented.

In an entry, fields are provided in order to store various information. If the entry belongs to the used list, the amount of effective information increases.

In an entry 230, a segment start position field and a segment end position field store information about the positions of the segment of the data region which is managed by the entry. A subsequent flag, in the list, stores information as to whether there is an entry which follows the entry. A subsequent entry represents a number of the subsequent entry in the list. A protect flag prevents the user from erroneously erasing the contents. If the flag is effective, it is not possible to erase the corresponding segment.

In the entry 230, a field of recording date and time, and a field of recording length respectively store a date and time of recording start, and length of the recording. A head flag stores information whether the recording is started on the segment. This corresponds to a cutting position in a broadcast program or in an image taken by a video camera. A program title field and a program content field respectively store the title and content of the program in a text style.

In the entry 230, a field of reproduction date and time, and a field of reproduction position respectively store the date and time when the reproduction is finished, and the position where the reproduction is finished. An automatic erase flag stores information as to whether the content should be automatically erased after the reproduction of the content is finished.

By managing these data structures, the contents, which are video data and audio data stored in the data region, can be randomly accessed, recorded, reproduced, edited, or erased.

Figure 3:
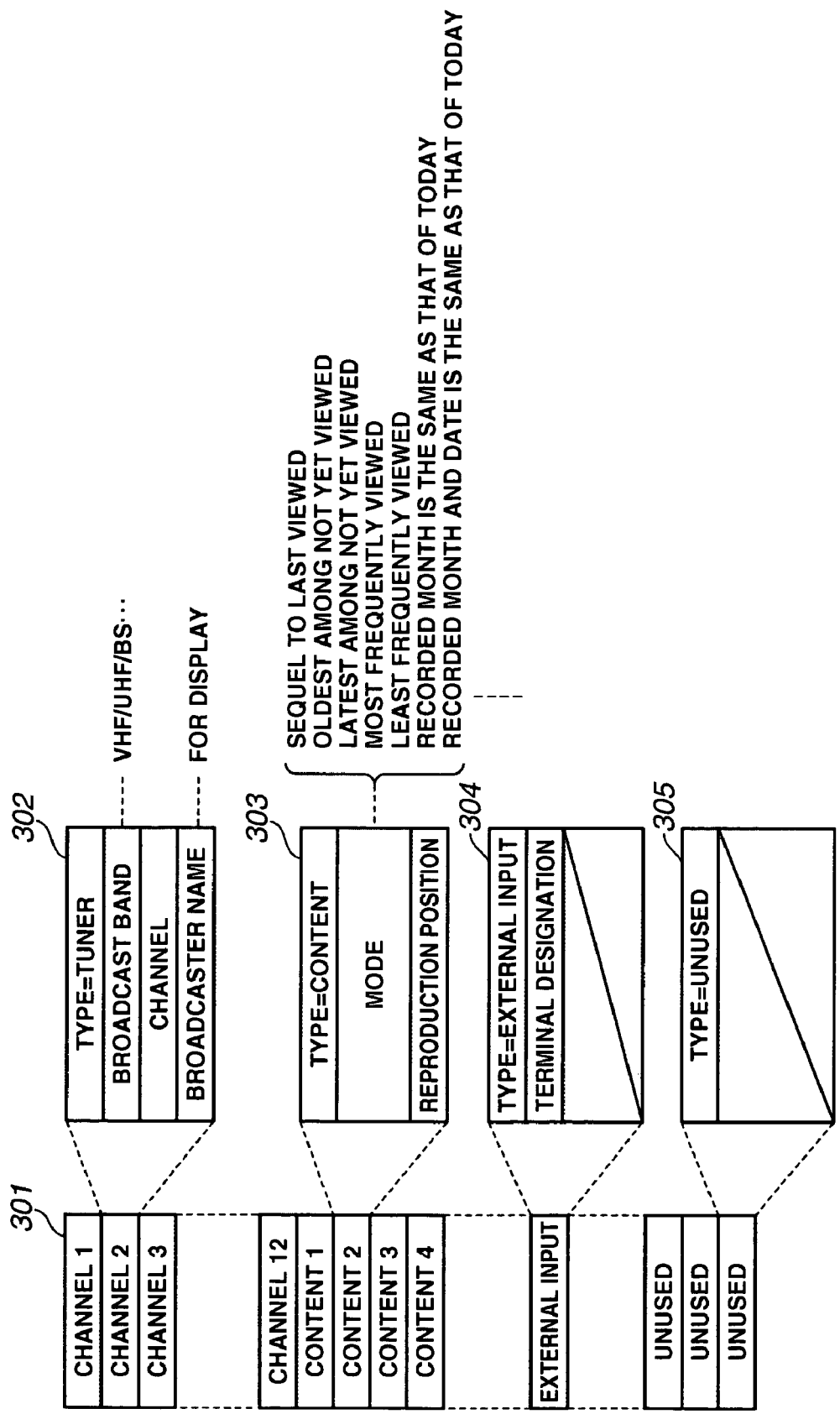
FIG. 3 illustrates an exemplary channel table.

FIG. 3 illustrates an example channel table. When the operation unit 114 designates a broadcast channel to be received, the channel table enables associating and storing information about the received broadcast channel. Further, in the exemplary embodiment, it is possible to associate information about an instruction to reproduce program data recorded on the HDD unit 107 with a channel number which can be designated by the operation unit 114 and to store the associated information. In a case where the operation unit 114 designates the channel to which the information about the reproduction instruction is allocated, the data is reproduced from the HDD unit 107 in accordance with the information described on the table, as described below.

In FIG. 3 are shown a channel table 301, a tuner entry 302, a content entry 303, an external input entry 304, and an unused entry 305. A channel table 301 will be described with reference to FIG. 3

Each entry in the channel table 301 respectively corresponds to the channel that can be designated by the operation unit 114. The user can directly designate the channel by depressing the number button provided on the operation unit 114. Also, the user can sequentially switch channels by depressing the channel-up/down button. Then, the controller 113 refers to the channel table. In accordance with the information of the field described in the entry corresponding to the designated channel, the controller 113 performs control to switch to the channel to be received, or to reproduce the contents recorded on the HDD unit 107.

Each entry in the channel table 301 has a type field, and in the type field, necessary data can be stored respectively. For example, in FIG. 3, a tuner entry 302 is allocated to a channel number 2. In the tuner entry 302, the type field indicates tuner. As information for controlling the tuner 101, band information such as VHF, UHF, BS, or the like is stored in a broadcast band field. In a channel field, a channel number is stored, and in a field of broadcaster name, the name of a broadcaster is stored in text format.

A content entry 303 is allocated to the channel number of content 2. In the content entry 303, the type field indicates content. As information for reproducing data recorded on the HDD unit 107, a manner of reproduction is stored in a mode field, and a position where reproduction starts is stored in a field of reproduction position.

As to the reproduction manner, it is possible to designate the manner such as reproducing data from sequel to the last viewed, reproducing data from the oldest among not yet viewed, reproducing data from the latest among not yet viewed, reproducing data from the most frequently viewed, reproducing data from the least frequently viewed, reproducing data which was recorded in the same month as today, and reproducing data which was recorded in the same month and date as today.

Further, in the mode field, a genre of content to be reproduced can be designated. For example, if the user designates a genre such as movies, sports, or animations, the contents of the genre allocated to the designated channel can be automatically searched and reproduced.

The position for starting the reproduction can be designated such as the head point, the sequel to the last viewed, the position where the recorded time corresponds to the current time, or a random position.

To the channel number of external input, an external input entry 304 is allocated. In the external input entry 304, the type field indicates external input. In a terminal designation field, information about designation of actual input is stored.

In an entry 305 of the unused channel number, the type field indicates unused. In the entry 305, it is not possible to directly make selection by depressing the number button such as provided in a remote controller. If the channel-up/down buttons are depressed, the instruction is skipped and selection cannot be made.

In the exemplary embodiment, as to the channel which the tuner 101 can receive, the type of tuner is automatically allocated to the corresponding channel number. As to the numbers except the channel to which the type of tuner is allocated, by operating the operation unit 114, the user can set a desired type field. It is also possible to set a reproduction manner or a reproduction position corresponding to the channel number to which the type of content is set.

Exemplary recordng operation of television broadcast is described next.

The controller 113 reads management information recorded on the HDD unit 107 and analizes the information so as to aquire information of contents recorded on the HDD unit 107. Further, the controller 113 refers to the channel table 301 stored on the nonvolatile memory 115.

When the controller 113 detects that the channel selection button of the operation unit 114 has been operated and an instruction to switch the channel has been given, the controller 113 refers to the channel table 301 and conducts a controlling operation in accordance with the information of the entry corresponding to the designated channel number.

That is, in a case where the type field of the entry indicates tuner, the broadcast band and the channel selection of the tuner unit 101 are set to be the broadcast band field and the channel field of the entry. Then, the input switching circuit 105 is controlled so that the video and audio signal output from the tuner unit 101 are selected and output. Further, the AV encoder 106, under the control from the controller 113, encodes the video and audio signal output from the input switching circit 105, and outputs the MPEG stream to the data bus 112.

The AV decoder 108, under the control from the controller 113, decodes the MPEG stream being output to the data bus 112, and outputs the video and audio signal. The display control circuit 109, under the control from the controller 113, superimposes information such as the number of channel and the name of broadcaster, the program title, or the name of content, on the video signal output from the AV decoder 108 and outputs the superimposed signal.

In this state, if the controller 113 detects that the recording button of the operation unit 114 is operated, the controller 113 causes the HDD unit 107 through the control bus 111 to start recording of the MPEG stream being output to the data bus 112.

At this time, the controller 113 causes the HDD unit 107 to extract the front frame of the recorded MPEG stream and store the image data of the front frame as a thumbnail image of the content.

Further, the controller 113, using the EPG information stored on the nonvolatile memory 115, detects information about the recorded broadcast program such as the program title, broadcast channel, or genre. Then, the controller 113 sends the additional information about the detected broadcast program to the HDD unit 107, and stores the information together with the MPEG data. Moreover, when the controller 113 detects that the stop button of the operation unit 114 is operated, the controller 113 causes the HDD unit 107 through the control bus 111 to stop the recording.

Next, the recording of data input from an external device, for example, the recording of video and audio data output from a video camera of DV type will be described.

The input processing circuit 103 decodes a stream input from the input terminal 104, and outputs an obtained video and audio signal. Further, the circuit separates meta data included in the stream.

The controller 113, in response to the instruction from the operation unit 114 to switch the channel, refers to the channel table 301 and conducts a controlling operation in accordance with the information of the entry corresponding to the designated channel number.

If the type field of the entry indicates external input, under the control of the controller 113, the input switching circuit 105 selects the video and the audio signal output from the input processing circuit 103, and outputs the selected signals.

The AV encoder 106, under the control of the controller 113, encodes the video and the audio signal output from the input switching circuit 105, and outputs the MPEG stream to the data bus 112. The AV decoder 108, under the control of the controller 113, decodes the MPEG stream being output to the data bus 112, and outputs the video and the audio signal. The display control unit 109, under the control of the controller 113, superimposes information about the channel number on the video signal output from the AV decoder 108.

Under the above-described condition, if the controller 113 detects that the recording button of the operation unit 114 is depressed, the controller 113 causes the HDD unit 107 to start recording of the MPEG stream output to the data bus 112. At the same time, the controller acquires the meta data such as the recording date which is separated from the input control unit 103, stores the data in the management information, and records the data on the HDD unit 107. From the meta data, the position where recording starts on the tape being reproduced by a video camera can be detected. In such a case, the information that the data indicates the start of the record is recorded on the HDD unit 107.

Further, if the controller 113 detects that the stop button of the operation unit 114 is depressed, the controller 113 causes the HDD unit 107 to stop the recording.

By the above operation, the video and the audio signal input from the external device are recorded on the HDD unit 107.

Next, operation of reproducing a program will be described. The reproduction of the program includes two cases; the reproduction of a television broadcast received by the tuner, and the reproduction of data stored on the HDD unit 107.

First, the case will be described where the user selects desired content from the contents recorded on the HDD unit 107, and reproduces the selected content.

The controller 113 reads the management information on the HDD unit 107, and analyzes the information to acquire information on contents recorded on the HDD unit 107.

Under the above-described condition, if the operation unit 114 instructs the controller 113 to display a contents list, the controller 113 controls the HDD unit 107 in accordance with the management information, and reads data of thumbnail image data of each recorded content. Then, the controller causes the AV decoder 108 to decode the read data of the thumbnail image, and outputs the data to the display control circuit 109. Further, the controller 113 detects additional information recorded together with the MPEG data of each content, and sends the additional information such as a program title, or a broadcast channel to the display control circuit 109. Then, the controller causes the display control circuit 109 to generate data of the thumbnail list screen including a thumbnail image and the additional information, and outputs the data.

The user views the thumbnail list screen, and operates the operation unit 114 in order to select the thumbnail of the content that he wishes to reproduce. The controller 113 causes the HDD unit 107 to reproduce the data of the content corresponding to the selected thumbnail. Then, the controller 113 causes the AV decoder 108 and the display control circuit 109 to decode and output the data of the reproduced content.

Further, the controller 113, during the reproduction of the content recorded on the HDD unit 107 as described above, conducts the control corresponding to each operation button such as the fast-forward button, the fast-rewind button, the pause button, or the stop button in response to the operation unit 114. Especially, when the stop button is depressed, the reproduction of the MPEG data output from the HDD unit 107 is stopped and, the operation is switched to outputting data of a broadcast program received by the tuner unit 101. In such a case, the broadcast channel that the tuner unit 101 receives is the broadcast channel that was being received before starting the reproduction from the HDD unit 107.

Figure 4:
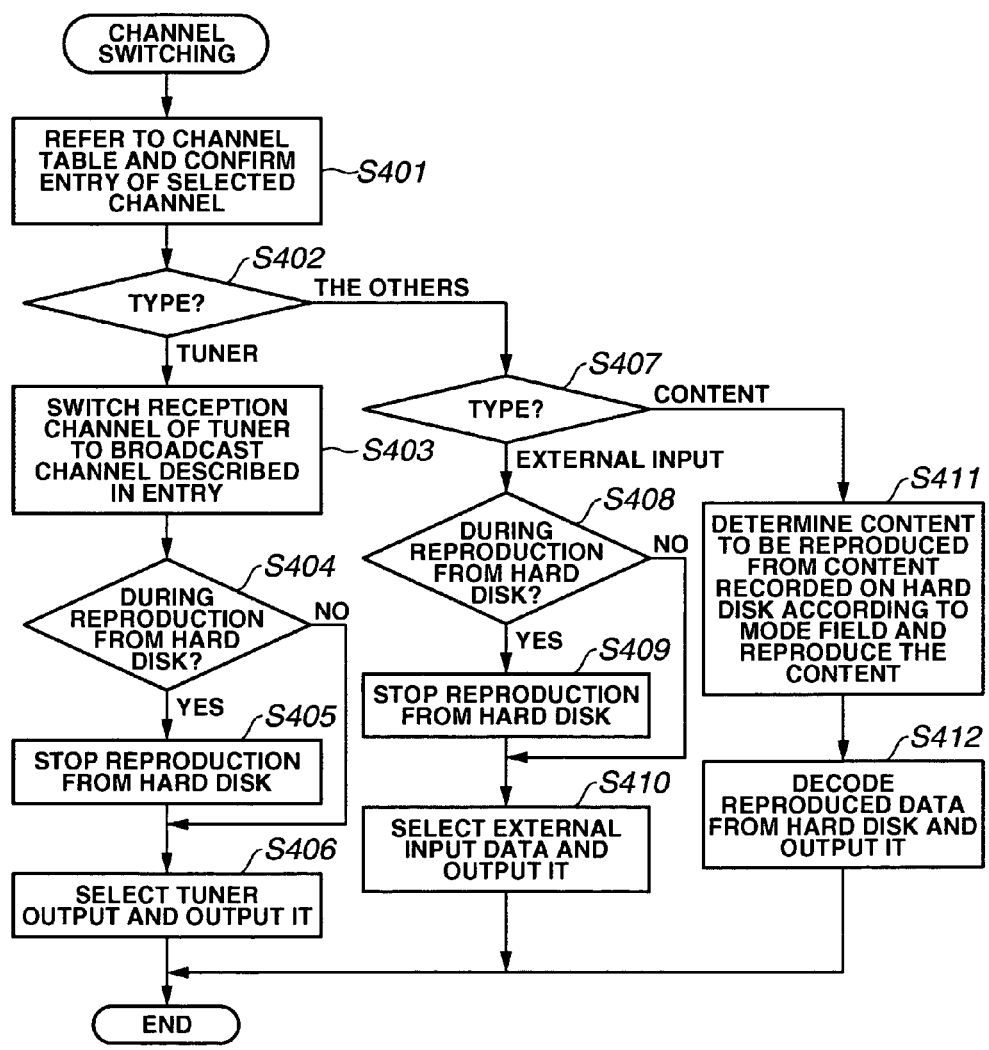
FIG. 4 is a flow chart for illustrating exemplary operation of a controller in switching channels.

Turning to FIG. 4, a reproduction operation will be described which is performed in response to an instruction from the operation unit 114 to switch channels.

As described above, if the controller 113 is instructed by the operation unit 114 to switch channels, the controller 113 refers to the channel table 301 and conducts the control operation in accordance with the information described in the entry corresponding to the designated channel number at step S401.

If the type field of the entry corresponding to the designated channel number indicates tuner (step S402), the broadcast band of the tuner unit 101 and the channel are set as described in the broadcast band field and the channel field of the entry at step S403, as described above. Then, it is detected (determined) whether the content is being reproduced from the HDD unit 107 at step S404. In a case where the content is not being reproduced from the HDD unit 107, processing proceeds to step S406. In a case where the content is being reproduced from the HDD unit 107, the reproduction from the HDD unit 107 is stopped at step S405. Then, the controller 113 writes information about the stop position on the field of reproduction position in the channel table. At step S406, the controller outputs the video and the audio signal output from the tuner unit 101 through the input switching circuit 105, the AV encoder 106, the data bus 112, and the AV decoder 108. Processing then ends.

On the other hand, if the type field of the entry corresponding to the designated channel number indicates external input (step S407), it is determined whether the content is being reproduced from the HDD unit 107 at step S408. In a case where the content is not being reproduced from the HDD unit 107, processing proceeds to step S410. In a case where the content is being reproduced from the HDD unit 107, the reproduction from the HDD unit 107 is stopped at step S409. At step S410, under the control from the controller 113, the input switching circuit 105 selects the video and the audio signal output from the input processing circuit 103 and outputs the signals. The AV decoder 108 decodes the MPEG stream being output to the data bus 112, and outputs the video and the audio signal under the control from the controller 113. Processing then ends.

If the type field of the entry corresponding to the designated channel number indicates content, in accordance with the information described in the mode field, the content to be reproduced is determined from the contents recorded on the HDD unit 107. Then, the controller 113 causes the HDD unit 107 to reproduce the MPEG data of the designated content, and sends the data to the AV decoder 108 at step S411. The AV decoder 108 decodes the reproduced MPEG data, and outputs the video signal to the display control circuit 109 at step S412. Processing then ends.

If the channel in the content 2 in FIG. 3 is designated by the operation of the user, it can be seen that the type field of the entry of the content 2 is content. Then, the controller 113, in accordance with the management information of the HDD 107, extracts the content which meets the conditions described in the mode field from the contents recorded on the HDD unit 107 and decides the content to be reproduced.

For example, if a content which belongs to the sports genre is set in the mode field, in accordance with the additional information of the broadcast program added at the time of recording, the content is selected for reproduction from the contents which belong to the sports genre. Then, in accordance with the information of the reproduction position field, the HDD unit 107 is controlled so as to determine the position of reproduction start in the selected content, and start the reproduction.

As described above, if the reproduction of the MPEG data is started from the HDD unit 107, similarly to the case where the reproduction is started using the thumbnail, the user can instruct the operations of fast-forward, fast-rewind, pause, or the like by the operation unit 114. However, in the exemplary embodiment, the operation of the stop button during the reproduction of the MPEG data by means of channel switching is invalid, and the reproduction is not stopped.

As described above, in accordance with the exemplary embodiment, if the instruction to reproduce the data recorded on the HDD unit 107 is set to the designated channel, the MPEG data recorded on the HDD unit 107 is reproduced, and the data is output instead of the broadcast program received by the tuner. Accordingly, the user can easily reproduce and watch the contents recorded on the HDD unit 107 by the operation similar to switching the ordinary broadcast channels.

Further, even when the user is watching the content recorded on the HDD unit 107, it is possible to watch the broadcast program of the desirable channel by just designating a channel number.

That is, during both of watching television broadcast and watching a content recorded on the HDD unit 107, by similar operation of designating the desired channel number, the user can switch to the broadcast program of the desired channel.

Further, if the user designates a genre or type of the content to the mode field of the channel table, it is possible to automatically reproduce the content of the designated genre, or type at each channel number.

In the above described exemplary embodiment, in response to the instruction of the channel number during reproduction of the content output from the HDD unit 107, the reproduction from the HDD unit 107 is stopped and switched to the output of the television program. However, the present invention can be applied to the other configurations, for example, the display screen may be divided in two screens. On one screen, an image of the content reproduced from the HDD unit 107 may be displayed, and on the other screen, an image of the television broadcast received by the tuner unit 101 may be displayed.

The controller 113 realizes the above case by controlling the display control circuit 109. Further, in the above case, either the audio signal of the content reproduced from the HDD unit 107 or the audio signal of television broadcast received by the tuner unit 101 can be selected to be output. However, one of the audio signals should be selected and output.

Further, in the exemplary embodiment, as shown in FIG. 3, the content reproduction entry is allocated to the channel number of the content 2. However, the configuration that the user allocates an entry of reception channel or a content reproduction entry to an arbitrary channel number is also possible in the present invention.

Moreover, in the exemplary embodiment, an apparatus configured to record and reproduce the video signal or the audio signal on and from the HDD is described. However, other recording mediums can be also used in the present invention. For example, recording mediums which are readily attachable and detachable by an attachment or an extraction mechanism such as an optical disk can be employed in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2005-118171 filed Apr. 15, 2005, which is hereby incorporated by reference herein in its entirety.

What is claimed is:

1. A recording apparatus comprising:
a receiving unit configured to receive a television broadcast;
a recording and reproducing unit configured to record image data of the broadcast program received by the receiving unit on a recording medium, and reproduce the image data from the recording medium;
an output unit configured to output the image data of the broadcast program received by the receiving unit and the image data reproduced from the recording medium to a display device;
a designating unit configured to designate one of a plurality of channel numbers;
a forming unit configured to allocate different channel numbers to a plurality of first information each indicating a different broadcast channel and a second information indicating a condition for searching the image data which is not yet reproduced among the plurality of image data recorded on the recording medium and to form a channel information including the plurality of channel numbers, the plurality of first information and the second information allocated to the plurality of channel numbers; and
a control unit configured to control the receiving unit and the recording and reproducing unit in accordance with the channel number designated by the designating unit and the channel information,
wherein the control unit causes the receiving unit to receive a broadcast program of the broadcast channel indicated by the first information allocated to the designated channel number if the first information is allocated to the designated channel number, and causes the recording and reproducing unit to select the image data which is not yet reproduced in accordance with the condition indicated by the second information allocated to the designated channel number among the plurality of image data recorded on the recording medium and reproduce the selected image data from the recording medium if the second information is allocated to the designated channel number.

2. A recording apparatus comprising:
a receiving unit configured to receive a television broadcast;
a recording and reproducing unit configured to record image data of the broadcast program received by the receiving unit on a recording medium, and reproduce the image data from the recording medium;
an output unit configured to output the image data of the broadcast program received by the receiving unit and the image data reproduced from the recording medium to a display device;
a designating unit configured to designate one of a plurality of channel numbers;
a forming unit configured to allocate different channel numbers to a plurality of first information each indicating a different broadcast channel and a second information indicating a condition of a recorded date of the image data to be reproduced among the plurality of image data recorded on the recording medium and to form a channel information including the plurality of channel numbers, the plurality of first information and the second information allocated to the plurality of channel numbers; and
a control unit configured to control the receiving unit and the recording and reproducing unit in accordance with the channel number designated by the designating unit and the channel information,
wherein the control unit causes the receiving unit to receive a broadcast program of the broadcast channel indicated by the first information allocated to the designated channel number if the first information is allocated to the designated channel number, and causes the recording and reproducing unit to select the image data of the recorded date meeting the condition indicated by the second information allocated to the designated channel number among the plurality of image data recorded on the recording medium and reproduce the selected image data from the recording medium if the second information is allocated to the designated channel number.

* * * * *